United States Patent [19]
Radli et al.

[11] Patent Number: 5,566,641
[45] Date of Patent: Oct. 22, 1996

[54] NO MESS LITTER BOX

[76] Inventors: Bruce A. Radli; Lorraine A. Radli, both of 64 Sunset Dr., Howell, N.J. 07731

[21] Appl. No.: 446,947

[22] Filed: May 15, 1995

[51] Int. Cl.⁶ .................................................. A01R 29/00
[52] U.S. Cl. ............................................................ 119/168
[58] Field of Search ...................................... 119/165, 168

[56] References Cited

U.S. PATENT DOCUMENTS

| | | | |
|---|---|---|---|
| 4,553,671 | 11/1985 | Cheesman | 119/168 X |
| 4,628,863 | 12/1986 | Eichenauer | 119/168 |
| 4,782,788 | 11/1988 | Arcand | 119/168 |
| 4,791,883 | 12/1988 | Lehman et al. | 119/168 |
| 4,890,576 | 1/1990 | James | 119/168 |
| 5,080,044 | 1/1992 | Bosworth | 119/168 |
| 5,249,550 | 10/1993 | Hines et al. | 119/168 |

*Primary Examiner*—Gene Mancene
*Assistant Examiner*—Thomas Price

[57] ABSTRACT

A no mess litter box for a pet that is disposable and includes a sheet which has a base with a rectangular border extending peripherally upward therefrom and a lower end border, a left side border and a right side border therebetween with the sheet including a fold line positioned on the base perpendicular to each side border. A pair of spaced opposed end panels with each panel having a left side, a right side a top end edge. A bottom end edge is in communication with a respective end border of the base and a fold line with a plurality of slits thereon perpendicular to the sides therebetween. Each fold line forms a pair of end walls and has a shelf in a plane above the base and points away from the base. A pair of spaced opposed side panels are provided. Each panel has left and right end sides and a bottom end edge in communication with a side border of the base. A top end edge has a pair of opposed sections sloping in a downward direction toward the sides with a plurality of creases and a plurality of fold lines. The pair of fold lines are positioned behind a respective end wall and form side walls. Each side wall is coupled to the end walls and form an open box capable of receiving litter.

19 Claims, 4 Drawing Sheets

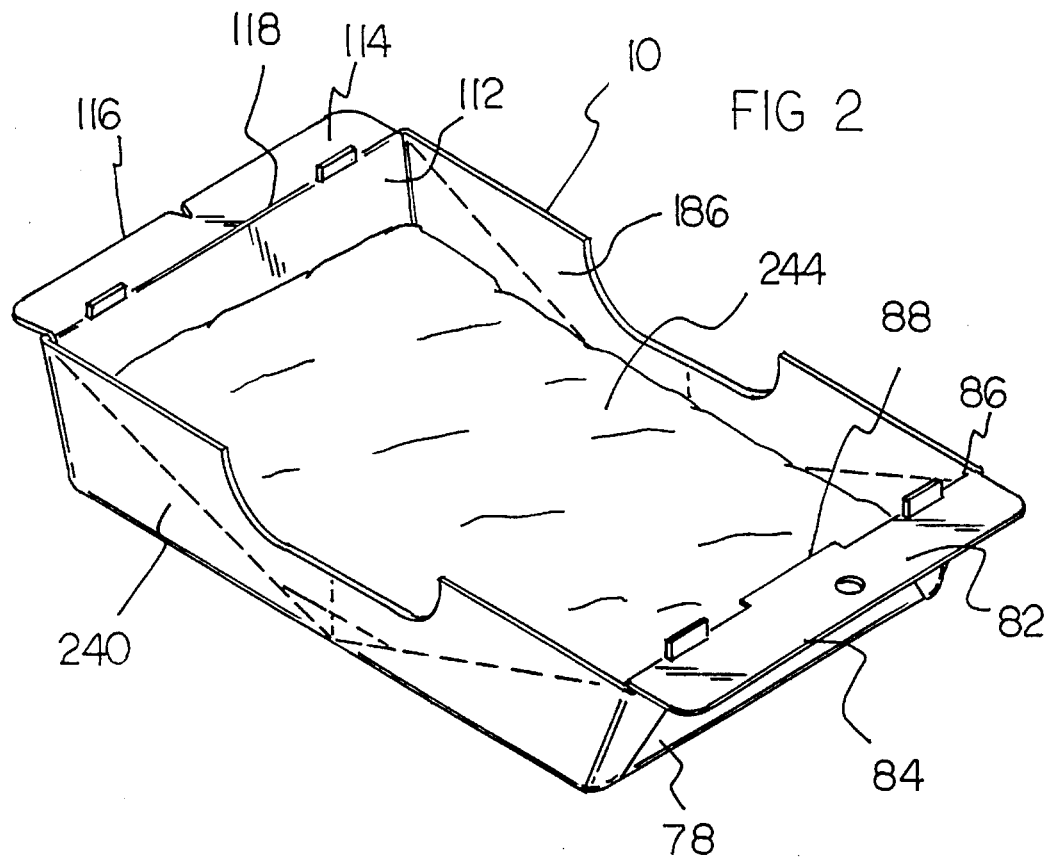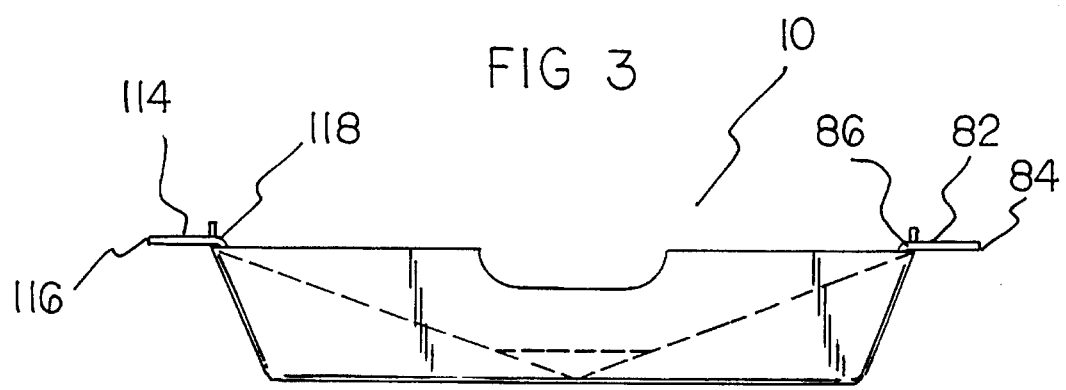

NO MESS LITTER BOX

BACKGROUND OF THE INVENTION

1. Field of the Invention

The present invention relates to a no mess litter box and more particularly pertains to forming a useable pet litter box, for receiving pet litter and waste, from a single sheet of rigid material by folding the sheet along crease and fold lines and further providing for quick and clean disposal of the litter box and litter when both are no longer useful.

2. Description of the Prior Art

The use of a pet litter box is known in the prior art. More specifically, pet litter boxes heretofore devised and utilized for the purpose of containing pet litter and pet waste are known to consist basically of familiar, expected, and obvious structural configurations, notwithstanding the myriad of designs encompassed by the crowded prior art which has been developed for the fulfillment of countless objectives and requirements.

By way of example, U.S. Pat. No. Design 310,588 to Valinsky discloses disposable cat litter box. U.S. Pat. No. 5,123,381 to Salmon discloses a disposable cat litter box. U.S. Pat. No. 5,167,205 to Bell and Kheradpir discloses a convertible disposable animal litter container. U.S. Pat. No. 5,203,282 to Hasiuk discloses a disposable litter container. U.S. Pat. No. 5,249,549 to Rockaitis discloses a disposable pet litter container. Lastly, U.S. Pat. No. 5,249,550 to Hines and Hines discloses a disposable litter box.

In this respect, the no mess litter box according to the present invention substantially departs from the conventional concepts and designs of the prior art, and in doing so provides an apparatus primarily developed for the purpose of forming a useable pet litter box, for receiving pet litter and waste, from a single sheet of rigid material by folding the sheet along crease and fold lines and further providing for quick and clean disposal of the litter box and litter when both are no longer useful.

Therefore, it can be appreciated that there exists a continuing need for a new and improved no mess litter box which can be used for forming a useable pet litter box, for receiving pet litter and waste, from a single sheet of rigid material by folding the sheet along crease and fold lines and further providing for quick and clean disposal of the litter box and litter when both are no longer useful. In this regard, the present invention substantially fulfills this need.

SUMMARY OF THE INVENTION

In view of the foregoing disadvantages inherent in the known types of a pet litter box now present in the prior art, the present invention provides an improved no mess litter box. As such, the general purpose of the present invention, which will be described subsequently in greater detail, is to provide a new and improved no mess litter box and method which has all the advantages of the prior art and none of the disadvantages.

To attain this, the present invention essentially comprises in combination a flexible sheet of rigid material having a base with a rectangular configuration with a border extended peripherally upward therefrom forming an upper end border, a lower end border, and a left side border and a right side border therebetween. The sheet has a non-symmetrical vertical fold line positioned on the base perpendicular to each side border. The non-symmetrical vertical fold line is capable of dividing the base into an upper section and a lower section with the upper section having a length greater than a length of the lower section. A pair of spaced opposed rigid end panels is included. The pair of end panels have a trapezoidal configuration forming a top end panel and a bottom end panel. The top end panel has a left side, a right side, a top end edge, a bottom end edge being in communication with the upper border of the base and a top vertical fold line perpendicular to the sides therebetween. The top end panel includes an opening positioned above the fold line and adjacent the top end edge. The top vertical fold line has a first horizontal slit, a second horizontal slit and a central horizontal slit therebetween. The first slit being adjacent the left side with the second slit adjacent the right side. The top fold line of the top panel when folded positions the top end panel in a plane horizontal to the base along the upper border and forms a top end wall. The top end wall has a height about between 4 to 5½ inches plus or minus ten percent. The top end edge being positioned in a plane parallel the base forms a top vertical shelf. The top vertical shelf has a front end edge and a back end edge with a locking tab formed thereon. The locking tab is formed from the central horizontal slit of the top panel. The bottom end panel has a left side, a right side, a top end edge, a bottom end edge being in communication with the lower border of the base and a bottom vertical fold line perpendicular to the sides therebetween. The bottom vertical fold line has a first horizontal slit adjacent the left side and a second horizontal slit adjacent the right side. The bottom fold line of the bottom panel when folded positions the bottom end panel in a plane horizontal to the base along the lower border forming a bottom end wall. The bottom end wall has a height about between 4 to 5½ inches plus or minus ten percent. The top end edge of the bottom panel being positioned in plane parallel the base forms a bottom vertical shelf. The bottom vertical shelf has a front end edge and a back end edge. Each vertical shelf points in a direction away from the base. Lastly, a pair of space opposed rigid side panels are included. The side panels having a rectangular configuration forming a left side panel and a right side panel. The left side panel having a left end side, a right end side, a bottom end edge being in communication with the left side border of the base, a top end edge concave along the center having a pair of opposed sections sloping horizontally in a downward direction toward the sides, a pair of diagonal creases, a vertical crease and a plurality of horizontal fold lines. The top end edge further including a fastener tab atop each section. The horizontal fold lines of the left panel adjacent the end sides being folded in an outwardly direction forming a pair of triangular flaps. The flaps have the fastener tab of the section of the top end edge being positioned thereon. The flaps, when moved forward in the direction of the top end wall and the bottom end wall, position the left panel in a plane horizontal to the base forming a left side wall. The left side wall have a height about between 4 to 5½ inches plus or minus ten percent. The left side wall maintains a horizontal position by passing the fastener taps through the respective horizontal slits of the top and bottom end walls and securing the fastener tabs within the horizontal slits. The right side panel has a left end side, a right end side, a bottom end edge being in communication with the right side border of the base, a top end edge concave along the center having a pair of opposed sections sloping horizontally in a downward direction toward the sides, a pair of diagonal creases, a vertical crease and a plurality of horizontal fold lines. The top end edge further including a fastener tab atop each section. The horizontal fold lines of the right panel adjacent the end sides being folded in an outwardly direction form a pair of triangular flaps. The flaps have the fastener tab of the section of the top end edge being positioned thereon. The flaps, when moved forward in the direction of the top end wall and the bottom end wall, position the right panel in a plane horizontal to the base forming a right side wall. The right side wall has a height about between 4 to 5½ inches plus or minus ten percent. The right side wall maintains a horizontal position by passing the fastener taps through the respective horizontal slits of the top and bottom end walls and securing the fastener tabs within the horizontal slits. Each side wall is coupled to the top and bottom end wall with the base to form a open box configuration capable of receiving a supply of litter.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved no mess litter box which has all of the advantages of the prior art pet litter box and none of the disadvantages.

It is another object of the present invention to provide a new and improved no mess litter box which may be easily and efficiently manufactured and marketed.

It is further object of the present invention to provide a new and improved no mess litter box which is of durable and reliable constructions.

An even further object of the present invention is to provide a new and improved no mess litter box which is susceptible of a low cost of manufacture with regard to both materials and labor, and which accordingly is then susceptible of low prices of sale to the consuming public, thereby making such No mess litter box economically available to the buying public.

Still yet another object of the present invention is to provide a new and improved no mess litter box which provides in the apparatuses and methods of the prior art some of the advantages thereof, while simultaneously overcoming some of the disadvantages normally associated therewith.

Even still another object of the present invention is to form a useable pet litter box, for receiving pet litter and waste, from a single sheet of rigid material by folding the sheet along crease and fold lines and further provide for quick and clean disposal of the litter box and litter when both are no longer useful.

Lastly, it is an object of the present invention to provide a new and improved no mess litter box for a pet that is disposable comprising a sheet having a base with a rectangular border extending peripherally upward therefrom forming of an upper end border, a lower end border, and a left side border and a right side border therebetween with the sheet including a vertical fold line positioned on the base perpendicular to each side border; a pair of spaced opposed end panels forming a top end panel and a bottom end panel with each panel having a left side, a right side a top end edge, a bottom end edge in communication with a respective end border of the base and a fold line with a plurality of slits thereon perpendicular to the sides therebetween, each fold line when folded up from the base forms a top and a bottom end wall each having a shelf along the top end edge of each wall with each shelf in a plane above the base and pointing away form the base; and a pair of spaced opposed side panels forming a left side panel and a right side panel with each panel having a left end side, a right end side, a bottom end edge being in communication with a respective side border of the base, a top end edge having a pair of opposed sections sloping in a downward direction toward the sides, a plurality of creases and a plurality of fold lines, one each fold line when folded outward form a pair of flaps at each sections of the top end edge being positioned behind a respective end wall and forming side walls, each side being coupled to the end walls forming a open box capable of receiving litter.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side elevational view of the no mess litter box made from the form of FIG. 1, and showed in the open box configuration.

FIG. 3 is a side view of the litter box of FIG. 2 showing a side wall.

The same reference numerals refer to the same parts through the various Figures.

DESCRIPTION OF THE PREFERRED EMBODIMENT

Figure 1:
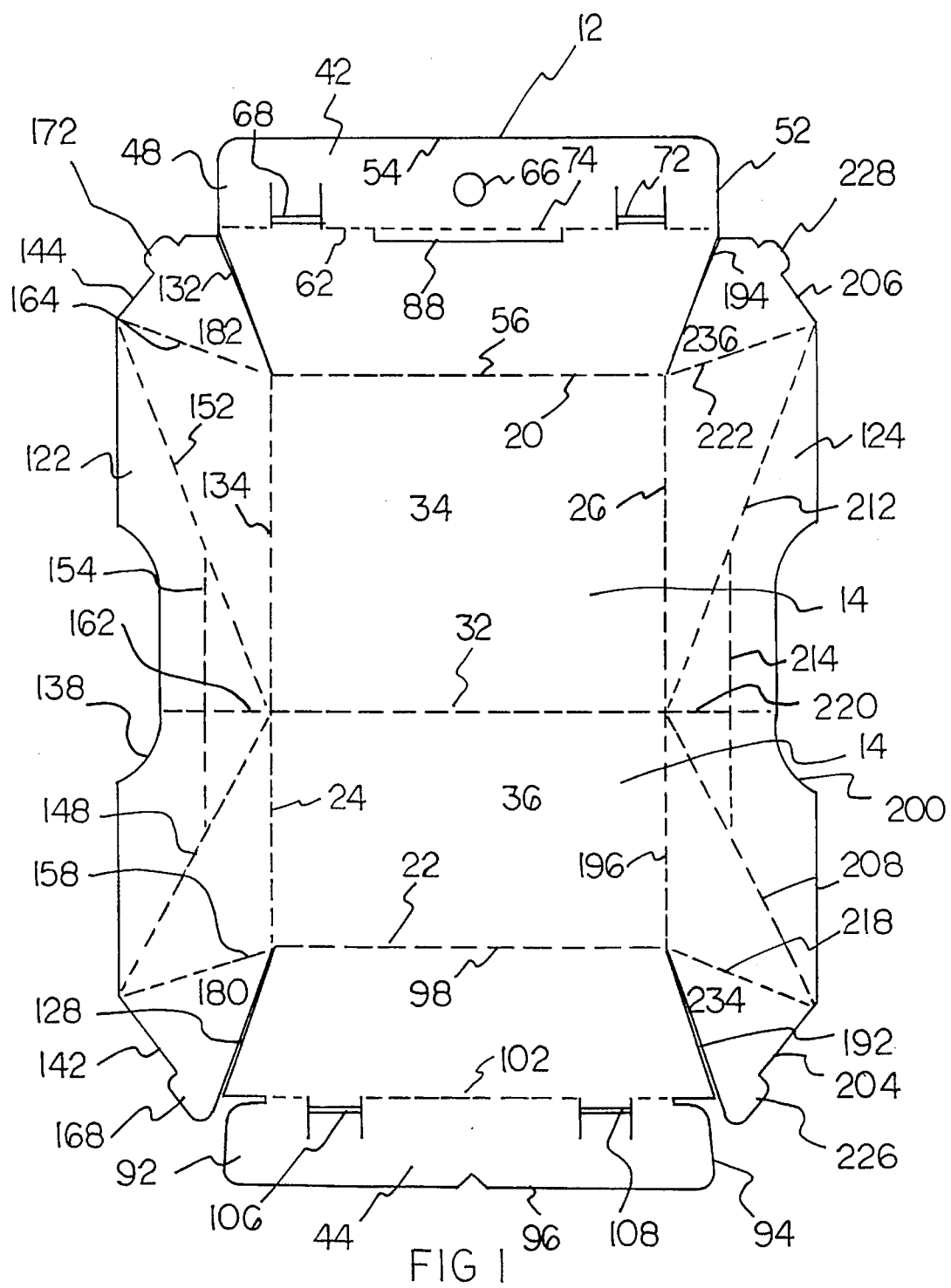
FIG. 1 is a perspective view of a flat form with crease and fold lines of the preferred embodiment of the no mess litter box constructed in accordance with the principles of the present invention.

With reference now to the drawings, and in particular to FIG. 1 thereof, the preferred embodiment of the new and improved no mess litter box embodying the principles and concepts of the present invention and generally designated by the reference numeral 10 will be described.

The present invention, the no mess litter box 10 is comprised of a plurality of components. Such components in their broadest context include a base, a pair end walls, and a pair of side walls. Such components are individually configured and correlated with respect to each other so as to attain the desired objective.

Specifically, the present invention is comprised of a flexible sheet 12 of rigid material such as water resistant corrugated cardboard having a base 14 as shown in FIG. 1. The base has a rectangular configuration with a border extended peripherally upward therefrom forming an upper end border 20, a lower end border 22, and a left side border 24 and a right side border 26 therebetween. The sheet, as shown in FIG. 1, has a non-symmetrical vertical fold line 32 positioned on the base perpendicular to each side border. The non-symmetrical vertical fold line is capable of dividing the base into an upper section 34 and a lower section 36 with the upper section having a length greater than a length of the lower section.

Also included is a pair of spaced opposed rigid end panels 42 and 44 as shown in FIG. 1. The end panels have a trapezoidal configuration and form a top end panel 42 and a bottom end panel 44. The top end panel has a left side 48, a right side 52, a top end edge 54, a bottom end edge 56 being in communication with the upper border of the base and a top vertical fold line 62 perpendicular to the sides therebetween as shown in FIG. 1. The top end panel including an opening 66 positioned above the fold line and adjacent the top end edge, the top vertical fold line having a first horizontal slit 68, a second horizontal slit 72 and a central horizontal slit 74 therebetween, the first slit being adjacent the left side with the second slit adjacent the right side. The top fold line of the top panel when folded positions the top end panel in a plane horizontal to the base along the upper border forming a top end wall 78 and as shown in FIG. 2. The top end wall has a height about between 4 to 5½ inches plus or minus ten percent. The top end edge is positioned in a plane parallel the base forming a top vertical shelf 82 as shown in FIG. 3. The top vertical shelf has a front end edge 84 and a back end edge 86 with a locking tab 88 formed thereon from the central horizontal slit 74 of the top panel. The bottom end panel 44 has a left side 92, a right side 94, a top end edge 96, a bottom end edge 98 being in communication with the lower border of the base and a bottom vertical fold line 102 perpendicular to the sides therebetween as shown in FIG. 1. The bottom vertical fold line has a first horizontal slit 106 being adjacent the left side and a second horizontal slit 108 being adjacent the right side. The bottom fold line of the bottom panel when folded positions the bottom end panel in a plane horizontal to the base along the lower border forming a bottom end wall 112 as shown in FIG. 2. The bottom end wall has a height about between 4 to 5 ½ inches plus or minus ten percent. The top end edge of the bottom panel is positioned in a plane parallel the base forming a bottom vertical shelf 114 as shown in FIG. 3. The bottom vertical shelf having a front end edge 116 and a back end edge 118. Each vertical shelf pointing in a direction away from the base as shown in FIG. 3.

Figure 4:
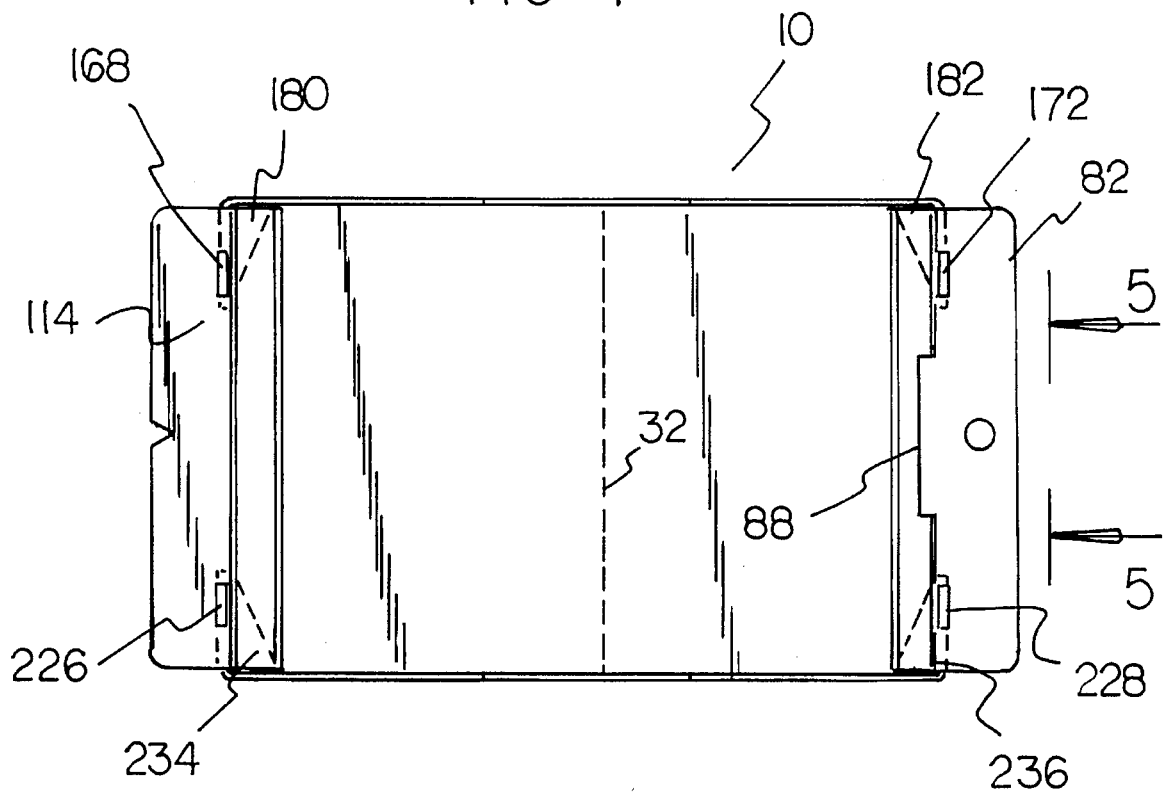
FIG. 4 is a top plane view of the preferred embodiment of the litter box of FIG. 2.

Lastly, a pair of space opposed rigid side panels 122 and 124 is included. The side panels having a rectangular configuration forming a left side panel 122 and a right side panel 124 as shown in FIG. 1. The left side panel has a left end side 128, a right end side 132, a bottom end edge 134 being in communication with the left side border 24 of the base 14, a top end edge 138 concave along the center having a pair of opposed sections 142 and 144 sloping horizontally in a downward direction toward the sides, a pair of diagonal creases 148 and 152, a vertical crease 154 and a plurality of horizontal fold lines 158, 162, and 164. The top end edge further including a fastener tab 168 and 172 atop each section. The horizontal fold lines of the left panel adjacent the end sides is folded in an outwardly direction and forms a pair of triangular flaps 180 and 182 with the fastener tab of the section of the top end edge positioned thereon. The flaps, when moved forward in the direction of the top end wall and the bottom end wall, position the left panel in a plane horizontal to the base forming a left side wall 186 as shown in FIG. 2. The left side wall having a height about between 4 to 5½ inches plus or minus ten percent. The left side wall maintaining a horizontal position by passing the fastener taps 168 and 172 through the respective horizontal slits 106 and 68 of the top and bottom end walls and securing the fastener tabs within the horizontal slits as best illustrated in FIG. 4. The right side panel has a left end side 192, a right end side 194, a bottom end edge 196 being in communication with the right side border 26 of the base, a top end edge 200 concave along the center having a pair of opposed sections 204 and 206 sloping horizontally in a downward direction toward the sides, a pair of diagonal creases 208 and 212, a vertical crease 214 and a plurality of horizontal fold lines 218, 220, and 222 as shown in FIG. 1. The top end edge further including a fastener tab 226 and 228 atop each section. The horizontal fold lines 218 and 222 of the right panel adjacent the end sides 192 and 194 being folded in an outwardly direction form a pair of triangular flaps 234 and 236 with the fastener tab 226 and 228 of the section of the top end edge being positioned thereon as shown in FIG. 1. The flaps, when moved forward in the direction of the top end wall 78 and the bottom end wall 112, position the right panel 124 in a plane horizontal to the base forming a right side wall 240 as shown in FIG. 2. The right side wall having a height about between 4 to 5½ inches plus or minus ten percent. FIG. 4 illustrated the right side wall maintaining a horizontal position by passing the fastener taps 226 and 228 through the respective horizontal slits 108 and 72 of the top and bottom end walls and securing the fastener tabs within the horizontal slits. As best illustrated in FIG. 2, each side wall being coupled to the top and bottom end wall forming a open box configuration with the base being capable of receiving a supply of litter 244.

Figure 5:
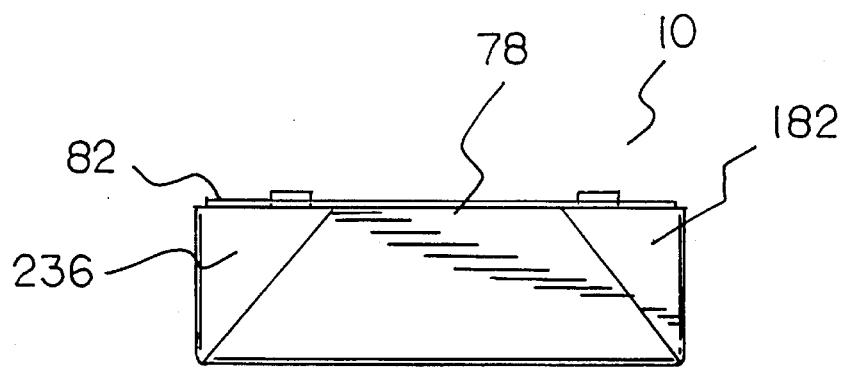
FIG. 5 is a side view of the litter box of FIG. 2 taken along lines 5—5 of FIG. 4 showing an end wall.

FIG. 5 depicts a pair of triangular flaps 236 and 182 of the litter box 10 of FIG. 4 showing the front of an end wall 78 with their fastener tabs in an upward direction. The fastener tabs as shown in FIG. 5 pull through a vertical shelf 82 of the end wall.

Figure 6:
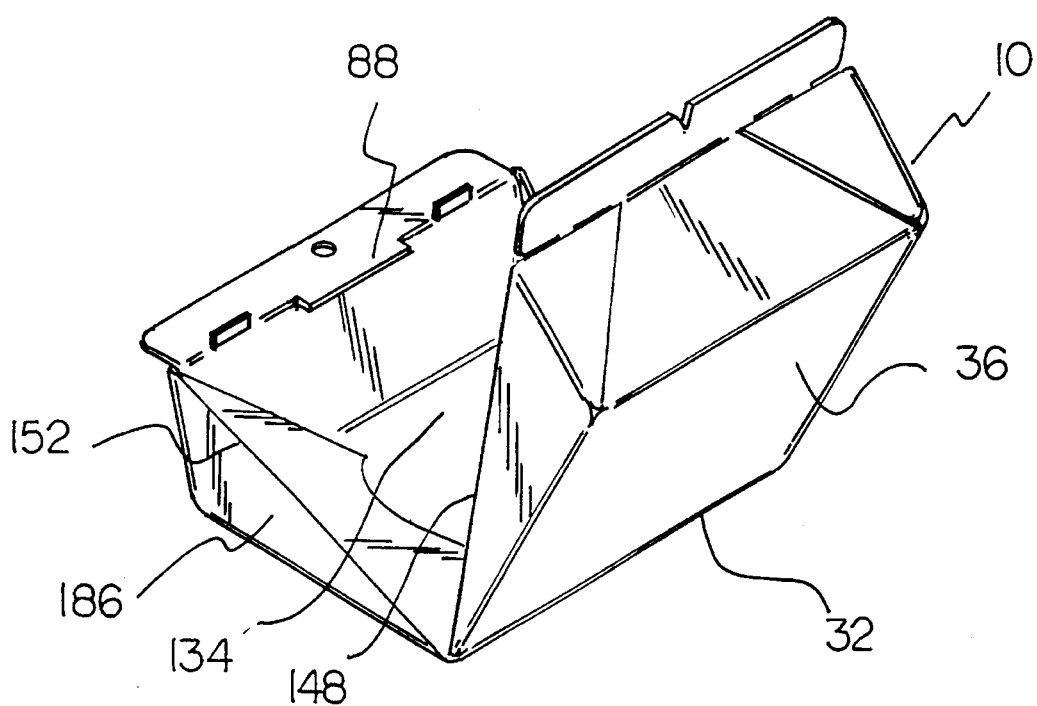
FIG. 6 is a perspective view of the litter box of FIG. 2 being folded along the crease and fold lines.
Figure 7:
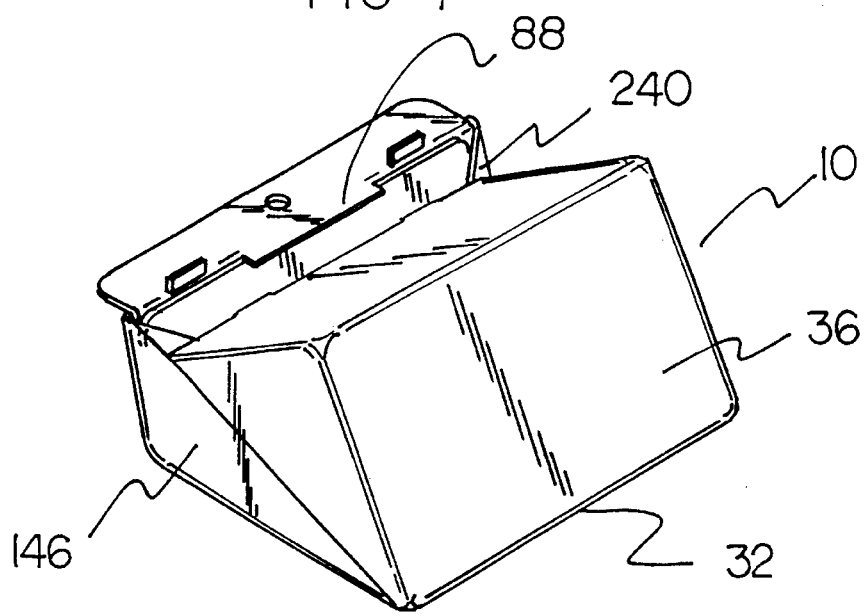
FIG. 7 is a perspective view of the litter box of FIG. 2 shown in the closed container configuration.

Finally, FIGS. 6 and 7 illustrate a functional embodiment of the no mess litter box 10. As shown in FIG. 6 the left side wall 186 is folded inward along the crease lines 152,154 (not shown) and 148. Depicted slightly in FIG. 7 the right side wall is folded inward along the crease lines. Both FIG. 6 and 7 show the no mess litter box folded along the vertical fold line 32 of the base 14 with the lower section 36 of the base positioned above the upper section 34 of the base.

The present invention is a no mess litter box that is disposable allowing the pet owner to avoid coming in direct contact with contaminated litter. The litter box is made from water resistant corrugated cardboard and initially comes in sheet form. The sheet having formed thereon a plurality of crease and fold lines which define the shape and size of the litter box. The creases and fold lines define a top end wall with a vertical shelf, a bottom end wall with a vertical shelf, a left side wall with a pair of flaps and a right end wall with a pair of flaps. Included along the top end edges of the side wall is a concave section that allows for ease of entry into the box by the pet. Also, included along the top end edges of the side wall are a plurality of fastener tabs. The fastener tabs are located atop the flaps of the side walls. The flaps are placed behind the end wall and the fastener taps are placed through slits in the end walls. The slits are along a fold line that forms the vertical shelf of the end edges. Pulling the fastener tabs completely through the slits secures them and this enables the side walls to remain standing while shoring up the end walls of the litter box. A non-symmetrical vertical fold line is formed on the base of the sheet and continues to the top end edges of the left and right side panels. This fold line, along with crease lines on the side panels, enables the litter box to be folded when the pet owner is ready to dispose of the litter box with litter therein.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved no mess litter box for a pet that is disposable comprising, in combination:

a flexible sheet of rigid material having a base with a rectangular configuration with a border extended peripherally upward therefrom forming an upper end border, a lower end border, and a left side border and a right side border therebetween, the sheet having a non-symmetrical vertical fold line positioned on the base perpendicular to each side border, the non-symmetrical vertical fold line capable of dividing the base into an upper section and a lower section with the upper section having a length greater than a length of the lower section;

a pair of spaced opposed rigid end panels having a trapezoidal configuration forming a top end panel and bottom end panel, the top end panel having a left side, a right side, a top end edge, a bottom end edge being in communication with the upper border of the base and a top vertical fold line perpendicular to the sides therebetween, the top end panel including an opening positioned above the top vertical fold line and adjacent the top end edge, the top vertical fold line having a first horizontal slit, a second horizontal slit and a central horizontal slit therebetween, the first slit being adjacent the left side with the second slit adjacent the right side, the top fold line of the top end panel when folded positions the top end panel in a plane horizontal to the base along the upper border forming a top end wall having a height about between 4 to 5½ inches plus or minus ten percent and the top end edge being positioned in a plane parallel the base forming a top vertical shelf, the top vertical shelf having a front end edge and a back end edge with a locking tab formed thereon from the central horizontal slit of the top panel, the bottom end panel having a left side, a right side, a top end edge, a bottom end edge being in communication with the lower border of the base and a bottom vertical fold line perpendicular to the sides there between, the bottom vertical fold line having a first horizontal slit being adjacent the left side of the bottom end panel and a second horizontal slit being adjacent the right side of the bottom end panel, the bottom fold line of the bottom panel when folded positions the bottom end panel in a plane horizontal to the base along the lower border forming a bottom end wall having a height about between 4 to 5½ inches plus or minus ten percent and the top end edge of the bottom panel being positioned in plane parallel the base forming a bottom vertical shelf, the bottom vertical shelf having a front end edge and a back end edge, each vertical shelf pointing in a direction away from the base; and a pair of space opposed rigid side panels having a rectangular configuration forming a left side panel and a right side panel, the left side panel having a left end side, a right end side, a bottom end edge being in communication with the left side border of the base, a top end edge concave along the center having a pair of opposed sections sloping horizontally in a downward direction toward the sides, a pair of diagonal creases, a vertical crease and a plurality of horizontal fold lines, the top end edge further including a fastener tab atop each section, the horizontal fold lines of the left panel adjacent the right end side being folded in an outwardly direction forming a pair of triangular flaps with the fastener tab of the section of the top end edge being positioned thereon, the flaps when moved forward in the direction of the top end wall and the bottom end wall positioning the left panel in a plane horizontal to the base forming a left side wall, the left side wall having a height about between 4 to 5½ inches plus or minus ten percent, the left side wall maintaining a horizontal position by passing the fastener tabs through the respective horizontal slits of the top and bottom end walls and securing the fastener tabs within the horizontal slits, the right side panel having a left end side, a right end side, a bottom end edge being in communication with the right side border of the base, a top end edge concave along the center having a pair of opposed sections sloping horizontally in a downward direction toward the side, a pair of diagonal creases, a vertical crease and a plurality of horizontal fold lines, the top end edge further including a fastener tab atop each section, the horizontal fold lines of the right panel adjacent the end sides being folded in an outwardly direction form a pair of triangular flaps with the fastener tab of the section of the top end edge being positioned thereon, the flaps when moved forward in the direction of the top end wall and the bottom end wall positioning the right panel in a plane horizontal to the base forming a right side wall, the right side wall having a height about between 4 to 5½ inches plus or minus ten percent, the right side wall maintaining a horizontal position by passing the fastener taps through the respective horizontal slits of the top and bottom end walls and securing the fastener tabs within the horizontal slits, each side wall being coupled to the top and bottom end wall forming a open box configuration with the base being capable of receiving a supply of litter.

2. A no mess litter box for a pet that is disposable comprising:

a sheet having a base with a rectangular border extending peripherally upward therefrom formed of an upper end border, a lower end border, and a left side border and a right side border therebetween with the sheet including a vertical fold line positioned on the base perpendicular to each side border;

a pair of spaced opposed end panels forming a top end panel and a bottom end panel with each panel having a left side, a right side, a top end edge, a bottom end edge in communication with a respective end border of the base and fold lines with a plurality of slits thereon perpendicular to the sides therebetween, each fold line of the end panels when folded up from the base forms a top and a bottom end wall each having a shelf along the top end edge of each wall with each shelf in a plane above the base and pointing away form the base; and a pair of spaced opposed side panels forming a left side panel and a right side panel with each panel having a left end side, a right end side, a bottom end edge being in communication with a respective side border of the base, a top end edge having a pair of opposed sections sloping in a downward direction toward the sides, a plurality of creases and a plurality of fold lines, one each fold line when folded outward form a pair of flaps at each sections of the top end edge being positioned behind a respective end wall and forming side walls, each side being coupled to the end walls forming a open box capable of receiving litter.

3. A no mess litter box for a pet as set forth in claim 2 wherein the sheet is formed of a rigid material.

4. A no mess litter box for a pet as set forth in claim 2 wherein the vertical fold line of the base is non-symmetrical and capable of dividing the base into an upper section and a lower section with the upper section having a length greater than a length of the lower section.

5. A no mess litter box for a pet as set forth in claim 2 wherein the top panel is formed of a rigid material having a trapezoidal configuration having the bottom end edge in communication with the upper border of the base.

6. A no mess litter box for a pet as set forth in claim 2 wherein the fold line of the top panel is a vertical fold line with the plurality of slits being horizontal and forming a first horizontal slit adjacent a left side, a second horizontal slit adjacent a right side and a central horizontal slit therebetween.

7. A no mess litter box for a pet as set forth in claim 2 wherein the top end panel further having an opening positioned above the fold line and adjacent a top end edge.

8. A no mess litter box for a pet as set forth in claim 2 wherein the top end wall has a height about between 4 to 5½ inches plus or minus ten percent with the shelf being a top vertical shelf positioned in a plane parallel the base.

9. A no mess litter box for a pet as set forth in claim 2 wherein the shelf further including a front end edge and a back end edge including a locking tab formed thereon.

10. A no mess litter box for a pet as set forth in claim 2 wherein the bottom panel is formed of a rigid material having a trapezoidal configuration having the bottom end edge in communication with the lower border of the base.

11. A no mess litter box for a pet as set forth in claim 2 wherein the fold line of the bottom panel is a vertical fold line with the plurality of slits being horizontal and forming a first horizontal slit adjacent a left side and a second horizontal slit adjacent a right side.

12. A no mess litter box for a pet as set forth in claim 2 wherein the bottom end wall has a height about between 4 to 5½ inches plus or minus ten percent with the shelf being a bottom vertical shelf positioned in a plane parallel the base.

13. A no mess litter box for a pet as set forth in claim 2 wherein the shelf further including a front end edge and a back end edge.

14. A no mess litter box for a pet as set forth in claim 2 wherein the left side panel and the right side panel is formed of a rigid material having a rectangular configuration with the bottom end edge of the left side panel being in communication with the left side border of the base, and the bottom end edge of the right side panel being in communication with the right side border of the base with each panel having the top end edge being concave at a center position.

15. A no mess litter box for a pet as set forth in claim 2 wherein the sloping sections of the left side panel and the right side panel are horizontal and have formed thereon fastener tabs atop each sections.

16. A no mess litter box for a pet as set forth in claim 2 wherein the plurality of creases of the left side panel and the right side panel form a pair of diagonal creases and a vertical crease.

17. A no mess litter box for a pet as set forth in claim 2 wherein the plurality of fold lines of the left side and right side panel having one each adjacent the left end side and the right end side of the side panels.

18. A no mess litter box-for a pet as set forth in claim 2 wherein the pair of flaps of the left side panel and right side panel being triangular having a fastener tab thereon capable of passing through a respective slit of each end panel and positioning the pair of side walls in an horizontal plane.

19. A no mess litter box for a pet as set forth in claim 2 wherein the pair of side walls form a left side wall and a right side wall with each side wall having a height about between 4 to 5½ inches plus or minus ten percent.

* * * * *